(12) United States Patent
Luo et al.

(10) Patent No.: US 8,495,610 B2
(45) Date of Patent: Jul. 23, 2013

(54) METHOD AND SYSTEM FOR PROCESS UPGRADE

(75) Inventors: Hanjun Luo, Shenzhen (CN); Boyan Tu, Shenzhen (CN); Yong Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 755 days.

(21) Appl. No.: 12/616,940

(22) Filed: Nov. 12, 2009

(65) Prior Publication Data

US 2010/0058315 A1 Mar. 4, 2010

Related U.S. Application Data

(63) Continuation of application No. PCT/CN2008/070812, filed on Apr. 25, 2008.

(30) Foreign Application Priority Data

May 17, 2007 (CN) .......................... 2007 1 0028054

(51) Int. Cl.
*G06F 9/44* (2006.01)
*G06F 9/445* (2006.01)

(52) U.S. Cl.
USPC ........... 717/168; 717/169; 717/170; 717/171; 717/172; 717/173; 717/174; 717/175; 717/176; 717/177; 717/178

(58) Field of Classification Search
None
See application file for complete search history.

(56) References Cited

U.S. PATENT DOCUMENTS 5,175,828 A * 12/1992 Hall et al. ..................... 719/331
5,339,430 A * 8/1994 Lundin et al. ................. 719/332
(Continued)

FOREIGN PATENT DOCUMENTS

CN 1300389 A 6/2001
CN 1502190 A 6/2004
(Continued)

OTHER PUBLICATIONS

"Dynamic Program Updating in a Distributed Computer System" by Mark E. Segal and Ophir Frieder, CH2615-3/88/0000/0198 1988 IEEE.*

(Continued)

*Primary Examiner* — Henry Tsai
*Assistant Examiner* — Jing-Yih Shyu
(74) *Attorney, Agent, or Firm* — Brinks Hofer Gilson & Lione

(57) ABSTRACT

A method and a system for process upgrade are disclosed. A source process implements data interaction, via a socket interface, with a far end entity connected with the socket interface. When the source process intends to upgrade itself, the source process copies its process data to a target process and determines if the data from the far end entity received via socket interface is complete. If it is determined that the data is complete, the source process ceases data interaction with the socket interface and copies the received data to the target process. After the data is copied, the source process sends an upgrade and switch indication to the target process and enables the target process to send an upgrade and switch request to the socket interface. The socket interface then switches a socket interface service to the target process. Accordingly, the technical solutions according to the present invention realize a reliable and smooth process upgrade without disconnecting the socket connection.

11 Claims, 3 Drawing Sheets

U.S. PATENT DOCUMENTS

| | | | | |
|---|---|---|---|---|
| 5,359,730 A * | 10/1994 | Marron | ............................ | 717/169 |
| 5,410,703 A * | 4/1995 | Nilsson et al. | .................. | 717/168 |
| 6,101,327 A * | 8/2000 | Holte-Rost et al. | ............ | 717/170 |
| 6,141,795 A * | 10/2000 | Laugner | ........................ | 717/170 |
| 6,314,567 B1 * | 11/2001 | Oberhauser et al. | ........... | 717/170 |
| 6,360,363 B1 * | 3/2002 | Moser et al. | ................... | 717/170 |
| 6,438,748 B1 * | 8/2002 | Gard et al. | ..................... | 717/168 |
| 6,622,159 B1 * | 9/2003 | Chao et al. | ..................... | 717/168 |
| 7,107,313 B2 * | 9/2006 | Fleming | ........................ | 709/205 |
| 7,107,329 B1 * | 9/2006 | Schroder et al. | ............... | 709/221 |
| 7,590,683 B2 * | 9/2009 | Bergen et al. | .................. | 709/203 |
| 7,610,582 B2 * | 10/2009 | Becker et al. | .................. | 717/171 |
| 7,644,189 B2 * | 1/2010 | Canal et al. | ..................... | 709/250 |
| 2004/0088693 A1 * | 5/2004 | Canal et al. | ..................... | 717/168 |
| 2007/0094656 A1 * | 4/2007 | Talati et al. | ..................... | 717/168 |

FOREIGN PATENT DOCUMENTS

| | | |
|---|---|---|
| CN | 1901724 A | 1/2007 |
| CN | 100464522 C | 10/2007 |
| CN | 101051941 A | 10/2007 |
| DE | 19810807 A1 | 9/1999 |
| WO | 0062158 A2 | 10/2000 |
| WO | WO 02/076020 A1 | 9/2002 |

OTHER PUBLICATIONS

"Remote Upgrading and Updating of AXE 10 software" p. 64-74 Ericsson_Review_vol. 73_1996_2.*

Wei, Wen-Kang et al., "Implementation of Nonstop Software Update for Client-Server Applications," Proceedings of the 2ih Annual International Computer Software and. Applications Conference, IEEE 2003.*

Written Opinion of the International Searching Authority (translation) dated (mailed) Aug. 14, 2008, issued in related Application No. PCT/CN2008/070812, filed Apr. 25, 2008, Huawei Technologies Co., Ltd.

Extended European Search Report dated (mailed) Feb. 17, 2011, issued in related Application No. 08734170.7-1244/2131528 , PCT/CN2008070812, Hauwei Technologies Co., Ltd.

Wei, Wen-Kang et al., "Implementation of Nonstop Software Update for Client-Server Applications," Proceedings of the 27th Annual International Computer Software and Applications Conference, IEEE 2003.

* cited by examiner

METHOD AND SYSTEM FOR PROCESS UPGRADE

CROSS-REFERENCE TO RELATED APPLICATIONS

This application is a continuation of International Application No. PCT/CN2008/070812, filed on Apr. 25, 2008, which claims priority to Chinese Application No. 200710028054.9, filed on May 17, 2007, both of which are hereby incorporated by reference in their entireties.

FIELD OF THE INVENTION

The present invention relates to communication field, and more specifically, to a method and system for process upgrade.

BACKGROUND

Process upgrade refers to start, in a system supporting multiple processes, a new process, copy the service in a source process to the new process, and deregister the source process. As a result, the process is upgraded. Process upgrade allows a process to be upgraded to a higher version so that defects or loopholes in the version of the source software process can be fixed.

In the case where the source process is an on-line process, i.e. Transfer Control Protocol (TCP) socket process, it is not easy to conduct an on-line upgrade for TCP socket process due to the complexity of TCP connection. Generally, socket connection needs to be released first. After the source process is upgraded to a new connected process, the socket connection is re-established. Therefore, due to the interruption in the socket connection during an upgrade procedure, data loss and process instability may be incurred and a far end entity coupled to the socket interface may also perceive the update of the local entity.

SUMMARY

A method and system for process upgrade are provided according to embodiments of the present invention so as to achieve process upgrade without disconnecting the socket connection.

To this end, the technical solutions according to the embodiments of the present invention are presented as follows.

A method for process upgrade is provided according to one embodiment of the present invention, wherein a source process conducts data interaction via a socket interface with a far end entity coupled to the socket interface.

The method includes: copying, by the source process, its process data to a target process; determining, by the source process, if the data from the far end entity received by a socket interface is complete; ceasing, if the data is complete, data interaction with the socket interface; and copying the received data to the target process; and sending, by the source process, an upgrade and switch indication to the target process; sending, by the target process, a request for upgrade and switch to the socket interface; switching, by the socket interface, a socket interface service to the target process.

A system for process upgrade is also disclosed according to one embodiment of the present invention. The system includes a source process unit, a socket interface unit and a target process unit.

The source process unit is configured to conduct data interaction with a far end entity coupled to the socket interface unit by virtue of a socket interface service provided by the socket interface unit; copy process data of the source process unit to the target process unit when the source process unit is upgrading its process; determine if the data from the far end entity received via the socket interface unit is complete; ceasing, if the data is complete, the data interaction with the socket interface unit; copy the received data to the target process unit; and send an upgrade and switch indication to the target process unit after the copying ends.

The target process unit is configured to send to the socket interface unit an upgrade and switch request after receiving the upgrade and switch indication from the source process unit; and employ the socket interface service provided by the socket interface unit to conduct data interaction with the far end entity coupled to the socket interface unit.

The socket interface unit is configured to provide the socket interface service to the target process unit and switch the socket interface service to the target process unit after receiving the upgrade and switch request from the target process unit.

As can be seen from the foregoing technical solutions, when the source process is upgrading itself, the source process copies its process data to the target process and determines if the data from the far end entity received via the socket interface are complete. If it is determined that the data is complete, the source process ceases the data interaction with the socket interface and copies the received data to the target process. After the copying, the source process sends an upgrade and switch indication to the target process so as to have the target process send an upgrade and switch request to the socket interface. The socket interface subsequently switches the socket interface service to the target process. As such, the process is upgraded reliably and smoothly without disconnecting the socket connection. In addition, the far end entity connected with the socket interface may not perceive the upgrade of the local entity before and after the upgrade procedure.

DETAILED DESCRIPTION

The purposes, technical solutions and advantages concerning embodiments of the present invention will become more readily appreciated by reference to the following description of the embodiments, when taken in conjunction with the accompanying drawings.

Figure 1:
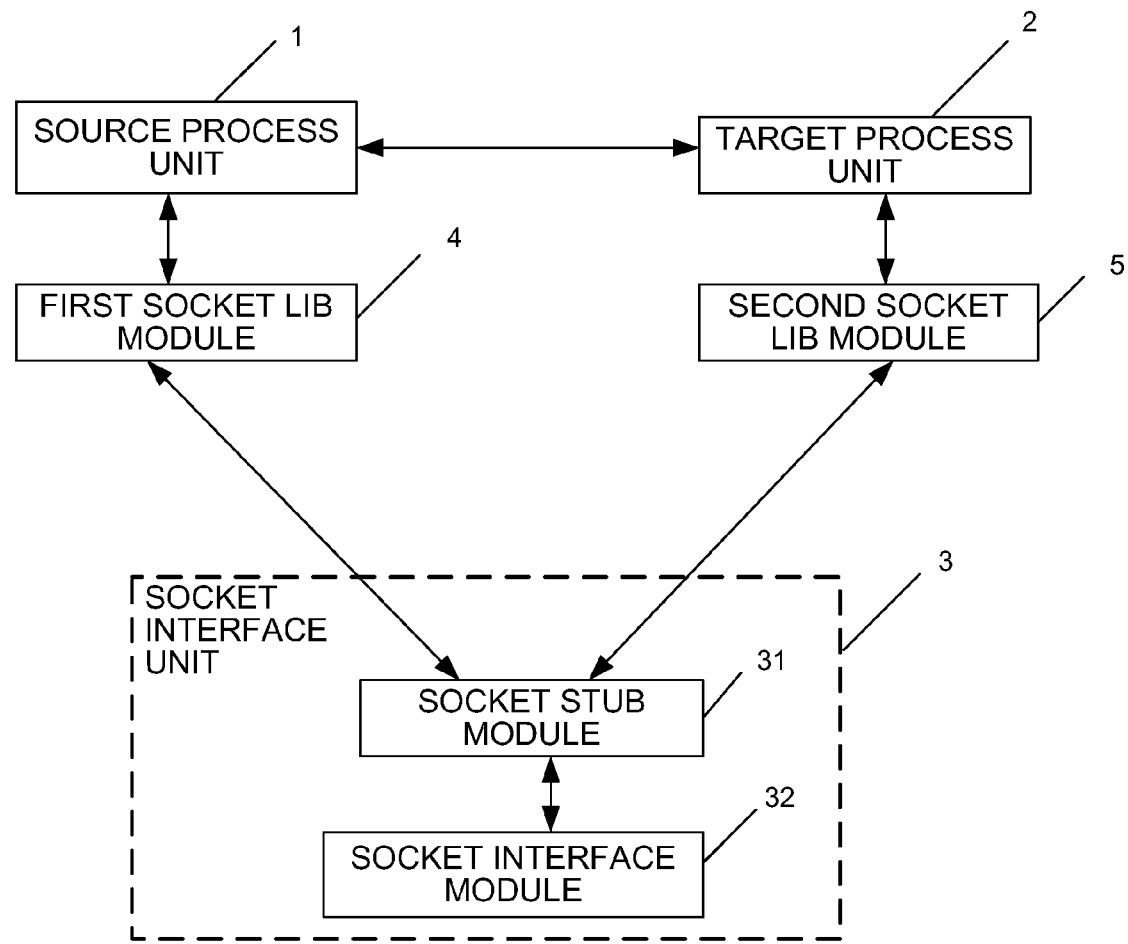
FIG. 1 is a block diagram of a system for process upgrade according to one embodiment of the present invention.

FIG. 1 is a block diagram of a system for process upgrade according to one embodiment of the present invention. As illustrated in FIG. 1, a system for process upgrade according to one embodiment of the present invention may include a source process unit 1, a target process unit 2, a socket interface unit 3, a first socket lib module 4 and a second socket lib module 5. Functionalities of each unit shown in FIG. 1 and relationship among these units are detailed below.

In FIG. 1, the source process unit 1 is configured to determine, during process upgrade, if the data received from a far end entity is complete. If the data is complete, data interaction with a socket interface unit 3 is ceased and the data received from the far end entity is copied to a target process unit 2. After the copying procedure is over, the source process unit 1 sends to the target process unit 2 an upgrade and switch indication.

Figure 2:
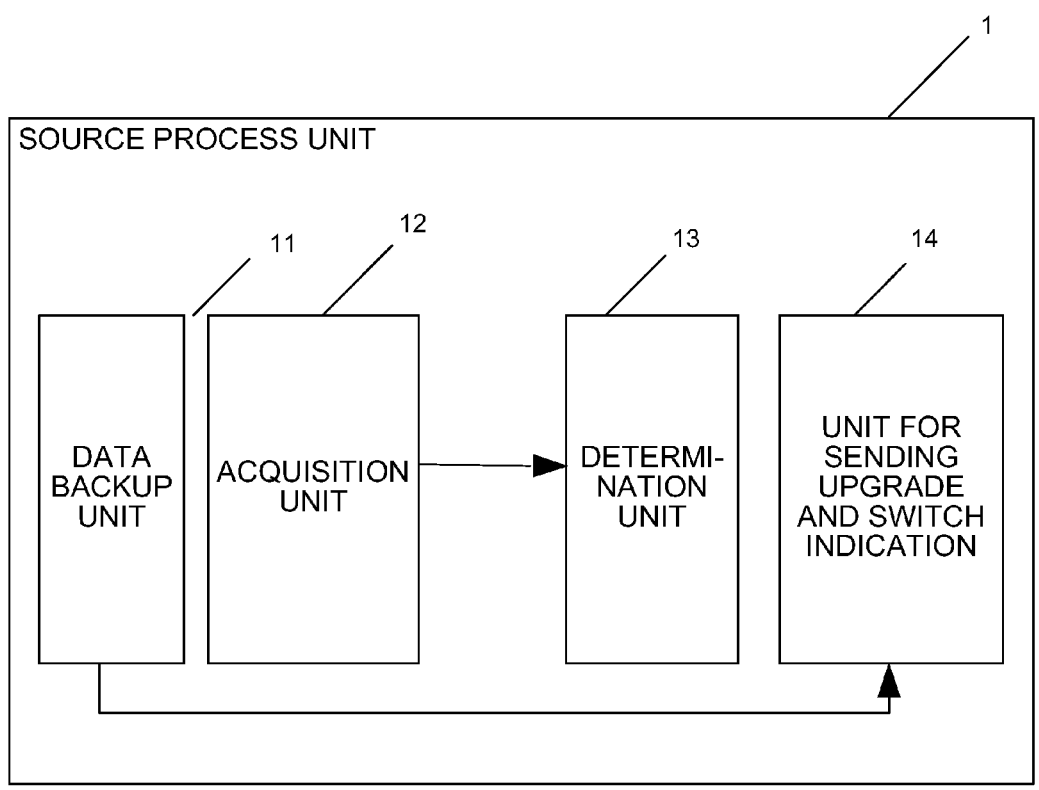
FIG. 2 is a block diagram of a source process unit 1 in FIG. 1.

FIG. 2 is a block diagram of a source process unit 1 shown in FIG. 1. As illustrated in FIG. 1, the source process unit 1 primarily includes a data backup unit 11, an acquisition unit 12, a determination unit 13 and a unit for sending upgrade and switch indication 14.

The data backup unit 11 is configured to copy process data of the source process unit 1 and the data from the far end entity received by the source process unit 1 via the socket interface unit 3 to the target process unit 2.

The process data of the source process unit1 includes parameters of invoked function after the initiation of source process and some command data of the source process such as various parameter configuration data and process status data generated during the running of the process. The purpose for data backup is to ensure that the data in the target process correspond to the data in the source process so that all the changed data in the source process during backup procedure are copied to the target process. Specifically, the backup procedure can be divided into batch backup and real-time backup. Because the socket interface unit 3 may keep sending the received data message to the source process unit 1, therefore, when conducting a batch backup, the data backup procedure will not stop until the source process unit 1 ceases data interaction with the socket interface unit 3.

The acquisition unit 12 is configured to acquire information of the length of the data received from the far end entity.

Specifically, in data receiving procedure, the acquisition unit 12 may acquire the information of the length of the data message by detecting a header of the data message received from the far end entity, where the data message is received by the source process unit 1 in which the acquisition unit 12 locates.

The determination unit 13 is configured to determine, based on the information of the length of the data, if the data received from the far end entity is complete, wherein the information of the length of the data is acquired by the acquisition unit 12 and the data is received from the far end entity. The determination unit 13 is further configured to generate a corresponding determination result. When the source process determines that the determination result is yes, the determination unit 13 ceases data interaction with the socket interface unit 3.

The unit for sending upgrade and switch indication 14 is configured to send an upgrade and switch indication to the target process unit 2 after the data backup unit 11 completes the backup.

Next, other units other than the source process unit 1 in FIG. 1 will be described.

The target process unit 2 is configured to send an upgrade and switch request to the socket interface unit 3 after receiving the upgrade and switch indication from the source process unit 1.

The upgrade and switch request carries a process ID associated with the target process and a service name which is the same as the source process.

The socket interface unit 3 is configured to switch a socket interface service to the target process unit 2 after receiving the upgrade and switch request from the target process unit 2, so that the target process unit 2 may interact data via the socket interface unit 3 with the far end entity coupled to the socket interface unit 3.

The socket interface unit 3 includes a socket stub module 31 and a socket interface module 32 for providing socket interface service. The function of the socket stub module 31 will be described below.

The source process unit 1 is provided with a first socket lib module 4. The target process unit 2 is provided with a second socket lib module 5. The socket interface unit 3 is provided with a socket stub module 31. In the socket-lib mechanism, the socket lib module is equivalent to a concise pseudo socket module that runs with an application in a same process. The socket stub module is equivalent to a proxy module that runs with a socket interface module in a same process. The socket-lib mechanism makes the application blind to the communication between processes. The application feels like using a standard socket interface without perceiving any invocation across different processes. With socket-lib mechanism, the function invocation between processes is transformed to an Inter-Process Communication (IPC) message. As such, the socket interface service is extended and expanded across different processes, while the socket interface itself does not change.

Before the process is upgraded and switched, a first relationship between the source process ID and the socket interface ID is created in the socket stub module 31. According to the first relationship, the socket stub module 31 may communicate with the source process unit 1 via the first socket lib module 4. In this way, the source process unit 1 may obtain a corresponding socket service of the socket interface module 32 via the socket lib module 4 and the socket stub module 31. When the source process unit 1 requests a socket service from the socket stub module 31, the source process unit 1 registers its service name with the socket stub module 31 so that the socket stub module 31 may manage a corresponding service.

When upgrading the process, the target process unit 2 sends to the socket stub module 31 an upgrade and switch request carrying a target process ID and a service name which is the same as the source process. After receiving the upgrade and switch request, the socket stub module 31 finds the first relationship based on the service name and replaces the source process ID in the first relationship with the target process ID. The target process unit 2 acquires, based on the updated first relationship, the socket service of the socket interface module 32 via the second socket lib module 5 and the socket stub module 31. Accordingly, the on-line upgrade of the process is achieved successfully and a corresponding socket connection does not need to be released during process upgrade so that the far end entity may not perceive the process upgrade of the local entity.

Figure 3:
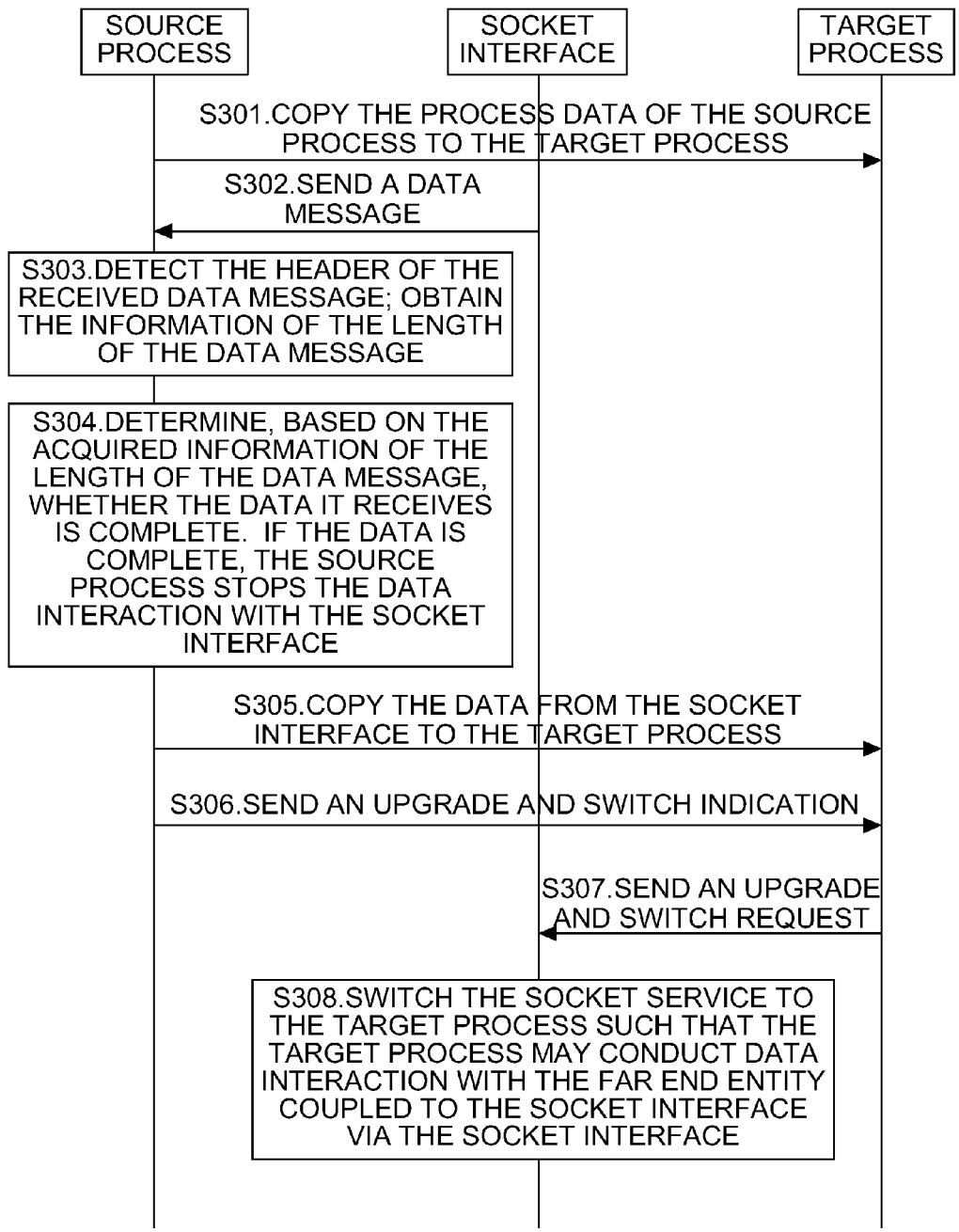
FIG. 3 is a flowchart of a method for process upgrade according to one embodiment of the present invention.

FIG. 3 is a flowchart of a method for process upgrade according to one embodiment of the present invention. As illustrated in FIG. 3, the method includes the following steps.

Step s301, a target process is created and the process data of a source process is copied to the target process.

The target process is created by executing a command of opening an application of higher version. The process data of the source process includes parameters of invoked function after the initiation of the process and some command data, etc. The purpose of data backup is to ensure the data in the target process to be identical with the data in the source process. Specifically, the backup procedure can be divided into batch backup and real-time backup. Because the socket interface may keep sending the received data message to the source process, therefore, when conducting a batch backup, the data backup procedure will not come to an end until the source process ceases data interaction with the socket interface.

Step s302: The socket interface sends a data message to the source process.

Here, the socket interface sends the data message received from a far end entity to the source process. The socket interface is a TCP socket interface or a User Datagram Protocol (UDP) socket interface or a RAW IP socket interface.

Step s303: The source process acquires the information of the length of the data message received from the far end entity.

Specifically, the source process may obtain the information of the length of the data message by detecting the header of the received data message.

Step s304: The source process determines, based on the acquired information of the length of the data received from the far end entity, if the data it receives is complete. If the data is complete, the source process stops the data interaction with the socket interface.

Step s305: The source process copies the data from the socket interface to the target process to ensure that the data in the target process is the same as the data in the source process.

Here, according to steps s305 and step s301, data in the source process is copied to the target process after the source process stops data interaction with the socket interface. As such, the data in the target process and the data in the source process are identical.

Step s306: The source process sends an upgrade and switch indication to the target process.

The purpose of sending an upgrade and switch indication to the target process is to inform the target process that the data backup is completed and the target process may request the socket service from the socket interface.

Step s307: The target process sends an upgrade and switch request to the socket interface.

Here, the upgrade and switch request carries a set target process ID.

Step s308: After the socket interface receives the upgrade and switch request, the socket interface switches the socket service to the target process so that the target process may conduct data interaction with the far end entity coupled to the socket interface unit via the socket interface.

Step s309: The source process is deregistered.

In step s307, the upgrade and switch request carries a process ID associated with the target process and a service name which is the same as the source process. In one embodiment, a socket-lib mechanism is used to allow the application process to continue receiving socket service in case of cross-process invocation. In the socket-lib mechanism, the socket lib module is equivalent to a concise pseudo socket module that runs with an application in a same process. The socket stub module is equivalent to a proxy module that runs with a socket interface module in a same process. The socket-lib mechanism makes the application blind to the communication between processes. The application feels like using a standard socket interface without perceiving any invocation across different processes. With socket-lib mechanism, the function invocation between processes is changed to IPC message. As such, the socket interface service is extended and expanded across different processes, while the socket interface itself does not change.

Before the process is upgraded and switched, a first relationship between the source process ID and the socket interface ID is created in the socket stub module corresponding to the socket interface. According to the first relationship, the socket lib module may communicate with the source process. In this way, the source process may obtain a corresponding socket service of the socket interface via the socket lib module and the socket stub module. When the source process requests a socket service from the socket stub module, the source process registers its service name with the socket stub module so that the socket stub module may manage a corresponding service.

When upgrading the process, the target process sends to the socket stub module an upgrade and switch request carrying a target process ID and a service name which is the same as the source process. After receiving the upgrade and switch request, the socket stub module finds the first relationship based on the service name and replaces the source process ID in the first relationship with the target process ID so as to update the first relationship. The target process acquires, based on the updated first relationship, the socket service of the socket interface via the second socket lib module and the socket stub module. Accordingly, the on-line upgrade of the process is achieved successfully and a corresponding socket connection does not need to be released when upgrading the process so that the far end entity may not perceive the process upgrade of the local entity.

Any two of the source process, socket interface and the target process as mentioned in various embodiments of the present invention communicate via an IPC message.

The foregoing teachings are merely preferred embodiments of the present invention. It shall be noted that improvements and modifications can be made by the ordinary people skilled in the art without departing from the principle of the present invention. These improvements and modifications shall be construed as fall within the scope of protection of the present invention.

What is claimed is:

1. A method for performing a process upgrade from a source process to a target process in a local entity, comprising: the local entity having a source process unit, a target process unit and a socket interface unit, wherein:

the source process unit performing the source process, the target process unit performing the target process, and the socket interface unit establishing a Transport Control Protocol (TCP) socket interface with a far end entity external to the local entity, wherein the source process is in communication with the far end entity via the TCP socket interface, the process upgrade comprising:

prior to creating of the target process, creating by the socket interface unit, a first mapping relationship between an identity (ID) of the source process and an ID of the TCP socket interface;

registering by the source process, a service name with the socket interface unit, such that the socket interface unit maintains a relationship between the service name and the first mapping relationship in order to receive data from the far end entity via the TCP socket interface;

copying by the source process, source process data to the target process, wherein the target process is created prior to the copying of the source process data to the target process;

copying by the source process, received data from the far end entity to the target process;

upon determining by the source process that the received data from the far end entity is complete: cease receiving far end entity data via the TCP socket interface without disconnecting the source process from the far end entity via the TCP socket interface, such that the TCP socket interface communicates received data from the far end entity with only one of: the source process or the target process, but not both during the process upgrade, and afterwards the source process sending an upgrade and switch indication to the target process;

sending by the target process, an upgrade and switch request to the socket interface unit, wherein the upgrade and switch request includes an ID of the target process and the service name;

switching, by the socket interface, a socket interface service to the target process, wherein the switching comprising:

searching for, by the socket interface unit, the first mapping relationship according to the service name obtained from the upgrade and switch request; and changing by the socket interface unit, the first mapping relationship to a second mapping relationship between an ID of the target process and the ID of the TCP socket interface, wherein the ID of the source process is replaced with the ID of the target process; and the socket interface unit switching to the target process according to the upgrade and switch request, such that the target process communicates with the far end entity via the TCP socket interface without disconnecting the source process from the TCP socket interface with the far end entity during the process upgrade.

2. The method of claim 1, wherein before the copying of the data received from the far end entity to the target process, comprising:

determining by the source process, whether the data received from the far end entity is complete, wherein the determining comprising:

acquiring a length of the data received from the far end entity by detecting a header of the data received from the far end entity; and determining whether the received data from the far end entity is complete based on the length of the received data.

3. The method of claim 1, wherein after switching the socket interface service to the target process, the method further comprising: deregistering the source process.

4. The method of claim 1, wherein the source process unit, the target process unit and the socket interface unit communicate data via an Inter-Process Communication message during performing the process upgrade.

5. The method of claim 1, wherein the socket interface unit is one of: a TCP socket interface or a UDP socket interface or a RAW IP socket interface.

6. A system for performing process upgrade from a source process to a target process in a local entity, comprising: the local entity having a source process unit, a socket interface unit and a target process unit, wherein:

the source process unit performing the source process, the target unit performing the target process, and the socket interface unit establishes a Transfer Control Protocol (TCP) socket interface with a far end entity external to the local entity, wherein the source process communicates source process data received from the far end entity via the TCP socket interface; wherein:

prior to creating of the target process, the socket interface unit creates a first mapping relationship between an identify (ID) of the source process and an ID of the TCP socket interface;

wherein the source process:

registers a service name with the socket interface unit, such that the socket interface unit maintains a relationship between the service name and the first mapping relationship in order to receive data from the far end entity via the TCP socket interface;

copies the source process data to the target process, wherein the target process is created prior to the copying of the source process data to the target process;

copies received data from the far end entity to the target process; and upon determining that the received data from the far end entity is complete: ceases receiving far end entity data via the TCP socket interface without disconnecting the source process from the far end entity via the TCP socket interface, such that the TCP socket interface communicates received data from the far end entity with only one of: the source process or the target process, but not both during the process upgrade, and afterwards the source process sends an upgrade and switch notification to the target process;

wherein the target process unit sends an upgrade and switch request to the socket interface unit after receiving the upgrade and switch notification, wherein the upgrade and switch request includes an ID of the target process and the service name; and wherein the socket interface unit switches a socket interface service to the target process, wherein the switching comprising the socket interface unit:

searches for the first mapping relationship according to the service name obtained from the upgrade and switch request, and changes the first mapping relationship to a second mapping relationship between an ID of the target process and the ID of the TCP socket interface, wherein the ID of the source process is replaced with the ID of the target process; and the socket interface unit switches to the target process according to the upgrade and switch request, such that the target process communicates with the far end entity via the TCP socket interface without disconnecting the source process from the TCP socket interface with the far end entity during the process upgrade.

7. The system of claim 6, wherein before the copying of data received from the far end entity to the target process, the source process unit determines if the data received from the far end entity via the socket interface unit is complete, wherein the determining comprising:

an acquisition unit which acquires a length of the data received by the source process unit from the far end entity by detecting a header of the data received from the far end entity, and the source process unit determines whether the data is complete based on the length of the received data if the data is complete, ceases data interaction with the socket interface unit.

8. The system of claim 6, further comprising:

a first socket lib module as an interface between the socket interface unit and the source process unit, the first socket lib module converts communications between the source process and the socket interface unit into Inter-Process Communication (IPC) messages during the performing of the process upgrade; and a second socket lib module as an interface between the socket interface unit and the target process unit, the second socket lib module converts communications between the target process and the socket interface unit into Inter-Process Communication (IPC) messages during the performing the process upgrade.

9. The system of claim 8, wherein the socket interface unit comprises: a socket interface module, configured to provide a socket service; and a socket stub module corresponding to the socket interface module, configured to achieve communication between the socket interface and a corresponding process according to a relationship between a process ID and a socket interface ID.

10. The system of claim 6, wherein any two of: the source process unit, the target process unit and the socket interface unit, communicate data via an Inter-Process Communication message.

11. A socket interface unit for carrying out process upgrade from a source process to a target process in a local entity, comprising a socket interface module and a socket stub module, wherein:
 the socket interface module provides a Transfer Control Protocol (TCP) socket interface for communication between the source process and a far end entity external to the local entity;
 the socket stub module creates a first mapping relationship between an ID of the source process and an ID of the TCP socket interface, receives a registration of a service name of the source process, and maintains a relationship between the service name and the first mapping relationship;
 wherein after determining that data received from the far end entity has been completely received by the source process:
 the socket interface module ceases receiving far end entity data via the TCP socket interface without disconnecting the source process from the far end entity via the TCP socket interface, such that the TCP socket interface communicates received data from the far end entity with only one of: the source process or the target process, but not both during the process upgrade;
 the socket stub module:
 receives an upgrade and switch request from the target process, wherein the upgrade and switch request includes an ID of the target process and the service name;
 changes the first mapping relationship to a second mapping relationship between an ID of the target process and the ID of the TCP socket interface, wherein the ID of the source process is replaced with the ID of the target process; and
 switches the source process to the target process according to the upgrade and switch request, such that the target process communicates with the far end entity via the TCP socket interface without disconnecting the source process from the TCP socket interface with the far end entity during the process upgrade.

* * * * *